C. S. MOSELEY & G. HUNTER.
Watch-Regulators.
No. 157,021. Patented Nov. 17, 1874.
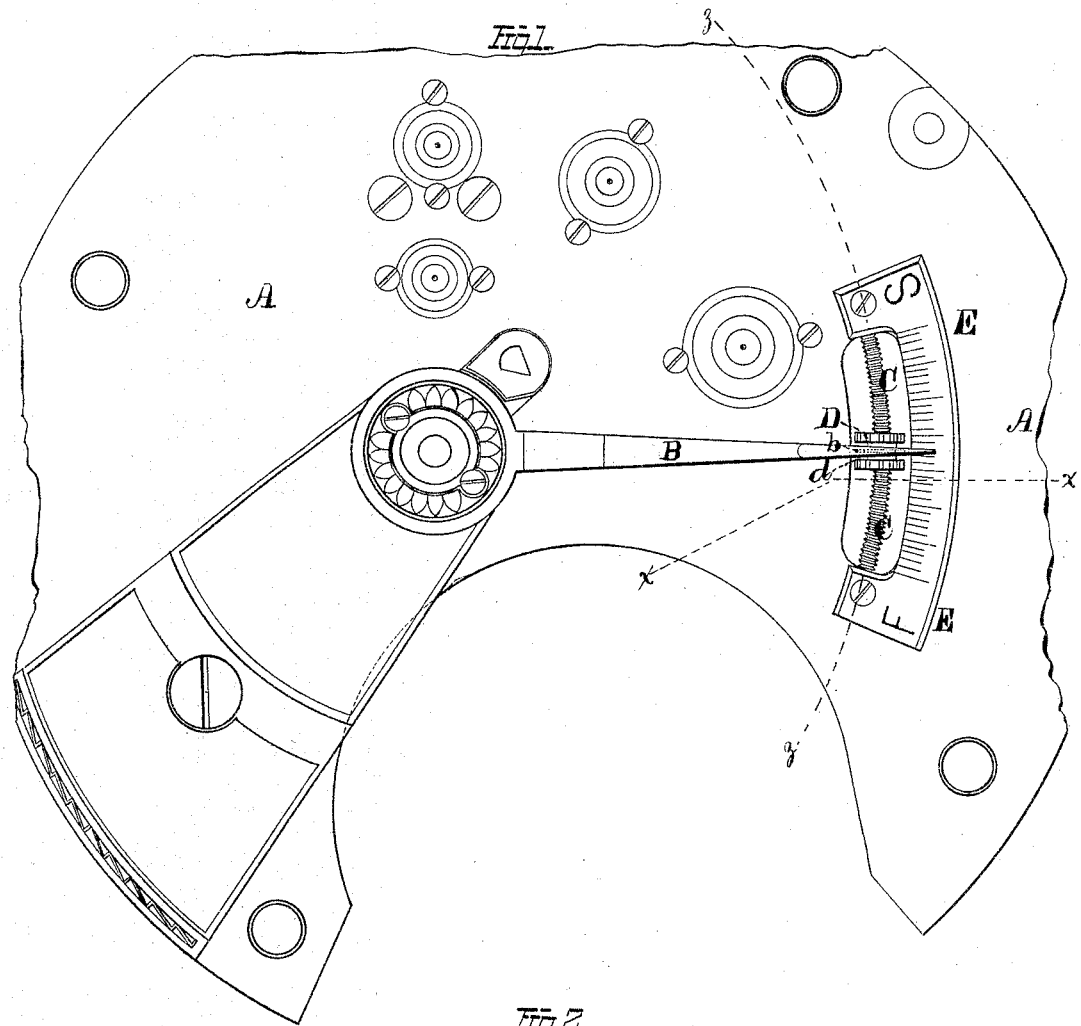
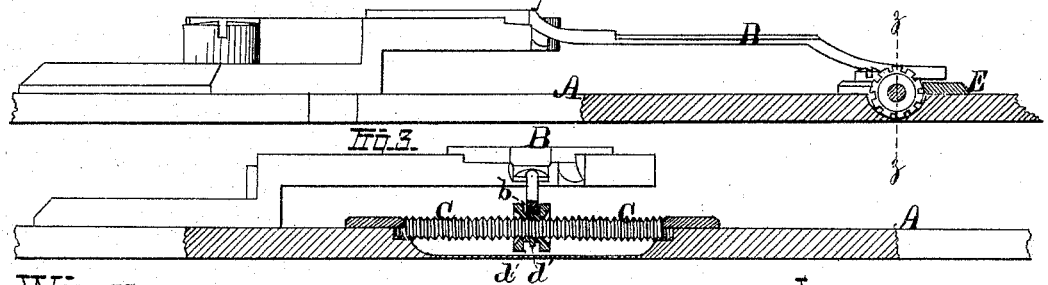
WITNESSES:
Jas. E. Hutchinson
John R. Young
INVENTOR.
Chas. S. Moseley and Geo. Hunter,
by Prindle and Co., their Attys

UNITED STATES PATENT OFFICE.

CHARLES S. MOSELEY AND GEORGE HUNTER, OF ELGIN, ILL., ASSIGNORS TO THE ELGIN NATIONAL WATCH COMPANY, OF SAME PLACE.

IMPROVEMENT IN WATCH-REGULATORS.

Specification forming part of Letters Patent No. 157,021, dated November 17, 1874; application filed October 15, 1874.

*To all whom it may concern:*

Be it known that we, CHAS. S. MOSELEY and GEO. HUNTER, of Elgin, in the county of Kane and in the State of Illinois, have invented certain new and useful Improvements in Watches; and do hereby declare that the following is a full, clear, and exact description thereof, reference being had to the accompanying drawing making a part of this specification, in which—

Figure 1 is a plan view of the upper side of a watch-movement upon an enlarged scale, showing our improved regulating mechanism. Fig. 2 is a side elevation and partial section of the same upon line $x$ $x$ of Fig. 1, and Fig. 3 is a section upon line $z$ $z$ of Figs. 1 and 2.

Letters of like name and kind refer to like parts in each of the figures.

Our invention is an improvement upon Letters Patent No. 81,907, issued September 8, 1868, to F. G. Johnson, and is designed to increase the accuracy and ease of operation of the mechanism; to which end it consists, principally, in the regulating-screw formed longitudinally upon a line concentric with the balance-center, substantially as and for the purpose hereinafter specified. It consists, further, in the means employed for connecting the regulator and its operating-nut, substantially as and for the purpose hereinafter shown. It consists, finally, in the regulating mechanism as a whole, its several parts being constructed and combined to operate in the manner and for the purpose hereinafter set forth.

In the annexed drawing, A represents the top plate of a watch-movement, which has any desired construction, and is provided with a regulator-arm, B, that, at its inner end, is pivoted, and is connected to or with the hair-spring of the balance-wheel in the usual manner. Beneath the outer end of the regulator B is placed a screw, C, which is formed longitudinally upon a line that is concentric with the balance-center, and at its ends is attached to or upon the plate A in such a manner as to leave its central portion free for the travel of a nut, D, that is fitted upon said screw. Within the periphery of the nut D is formed a groove, $d$, that is slightly larger than the portion of the regulator-arm immediately above the same, and within the bottom and at the transverse center of such groove is provided a tongue, $d'$, that has, preferably, about one-third the width of the same, and about one-half its radial dimensions. The outer portion of the regulator-arm B is curved downward, so as to cause it to be contained within the groove $d$, while within the lower side of said regulator is provided a groove, $b$, which corresponds to and embraces the tongue $d'$, the arrangement shown enabling the nut D to be rotated freely upon its screw without disturbing the relative positions of said nut and regulator. The periphery of the nut D is toothed or serrated, so as to permit it to be easily turned, and an index-plate, E, suitably divided by radial lines, is placed outside of the screw C, and immediately beneath the end of the regulator B, for the purpose of enabling the degree of motion to be correctly ascertained.

The mechanism is now complete, and operates in substantially the same manner as that before named, the nut being caused to travel over the screw in such direction and to such distance as it is desired to move the regulator-arm.

The advantages possessed by these improvements are as follows: First, by curving the screw the relative positions and movements of the nut and regulator-arm are constantly maintained, while in Johnson's mechanism the nut is nearest to the balance-center when at the longitudinal center of the screw, and recedes from the former whenever moved toward the ends of the latter, the result being that a given movement of said nut produces the greatest movement of the regulator when at the center of said screw, and the least movement of said regulator when near the ends of the latter. Second, by causing the nut to maintain the same position longitudinally upon the regulator-arm, much less liability exists for the occurence of "lost motion" between said parts than would be the case if said nut moved toward or from the balance-center as it traversed the screw. Third, the use of the tongue and groove as a means for connecting the regulator-arm and nut enables a finer connection to be made, and materially lessens the friction between said parts.

Having thus fully set forth the nature and merits of our invention, what we claim as new is—

1. The screw C, attached to or upon the plate A, formed longitudinally upon a line concentric with the balance-center, and combined with the nut D, which carries the end of the regulator B, substantially as and for the purpose specified.

2. The combination of the regulator B, having the groove $b$, with the nut D provided with the groove $d$ and tongue $d'$, substantially as and for the purpose shown.

3. The regulator B $b$, the curved screw C, the nut D, $d$, and $d'$, and the index-plate E, all constructed and combined with each other and with a watch-movement, in the manner and for the purpose substantially as set forth.

In testimony that we claim the foregoing we have hereunto set our hands this 9th day of October, 1874.

C. S. MOSELEY.
    GEORGE HUNTER.

Witnesses:
 M. M. MARSH,
 G. P. LORD.